Dec. 29, 1953   C. F. BONILLA   2,664,348
HIGH PRESSURE AND TEMPERATURE REACTION CHAMBER
Filed Aug. 5, 1949   2 Sheets-Sheet 1

INVENTOR.
C. F. BONILLA
BY Hudson & Young
ATTORNEYS

Dec. 29, 1953   C. F. BONILLA   2,664,348
HIGH PRESSURE AND TEMPERATURE REACTION CHAMBER
Filed Aug. 5, 1949   2 Sheets-Sheet 2

INVENTOR.
C. F. BONILLA
BY Hudson L. Young
ATTORNEYS

Patented Dec. 29, 1953

2,664,348

UNITED STATES PATENT OFFICE 2,664,348

HIGH PRESSURE AND TEMPERATURE REACTION CHAMBER

Charles F. Bonilla, New York, N. Y., assignor to Phillips Petroleum Company, a corporation of Delaware Application August 5, 1949, Serial No. 108,735

6 Claims. (Cl. 23—290)

This invention relates to reaction chambers for corrosive fluids. In on specific aspect it relates to a reaction chamber in which a reaction is carried out under high pressure with a corrosive fluid. In another specific aspect it relates to carrying out a reaction with a fluid which is seriously corrosive at elevated temperatures but which is not seriously corrosive at atmospheric temperature, which fluid is used to carry out a reaction at elevated temperature and pressure in a corrosion resistant chamber, the elevated pressure being necessary to increase the rate of reaction to a rate high enough to be commercially successful, it being well known that corrosion resistant materials are weak in resisting tensile stress, such as caused by elevated internal pressure.

In the prior art a number of chemical reactions, some of which are exothermic, and some of which are endothermic, have been proposed in which the reacting fluids during the reaction generate great heat, or need to be heated to a high temperature, in order to render the reaction commercially practical, and in a number of these reactions at least one of the fluids, or the reacting combination of fluids, is highly corrosive at the elevated temperatures which are unavoidable in the commercial operation of the reaction. Furthermore, many of these reactions do not progress at a high enough rate to be of commercial value unless the reactant fluids are placed under an elevated pressure considerably greater than atmospheric pressure. Because of the above mentioned factors many of these reactions have not proved commercially practical because no material known was economically usable to form the walls of the reaction chamber, because no material known could resist the triple combination of high temperature, high internal pressure, and high degree of corrosion present.

For example in producing alcohols from olefins by reaction with dilute sulfuric acid the reaction only proceeds at a commercial rate at high temperatures and high pressures. While dilute sulfuric acid is not corrosive at atmospheric temperatures, it is very corrosive at 500° F. which is sometimes attained in this process, at least locally. Lead lined steel cannot be used with complete safety at this temperature, or at higher temperatures, even though the melting point of lead is about 620 F., because there is always some local overheating. Numerous other examples can be given of processes employing dilute sulfuric, or hydrochloric acid, or other fluids which are very corrosive at elevated temperatures, but for which suitable corrosion-resistant materials are available at atmospheric temperature.

The present invention therefore consists in providing apparatus in which the reaction chamber is made of a relatively inexpensive corrosion-resisting material and such part of the inlet and outlet conduits as contain heated fluids are also made of this material, which material may be weak in tension. The portions of the apparatus made of this material which may be weak in tension are surrounded by a housing, and the spaces between the housing and the chamber are filled with an inert fluid under sufficient pressure to balance the internal pressure in the chamber and such parts of the inlet and outlet conduit as are made of said material.

One object of the present invention is to provide an improved reaction chamber.

Another object is to provide a reaction chamber suitable for reaction at greater temperatures and pressures than atmospheric.

Another object is to provide a reaction chamber for reactions in which at least one of the reaction fluids, or the combination of fluids, is corrosive at the temperature and pressure inside the reaction chamber.

Other objects are to provide simple and rugged details of construction, practical means for assembly, and regulating means for controlling the operation of such reaction chambers.

Numerous other objects and advantages will be apparent to those skilled in the art upon reading the accompanying specification, claims and drawing.

Figure 1:
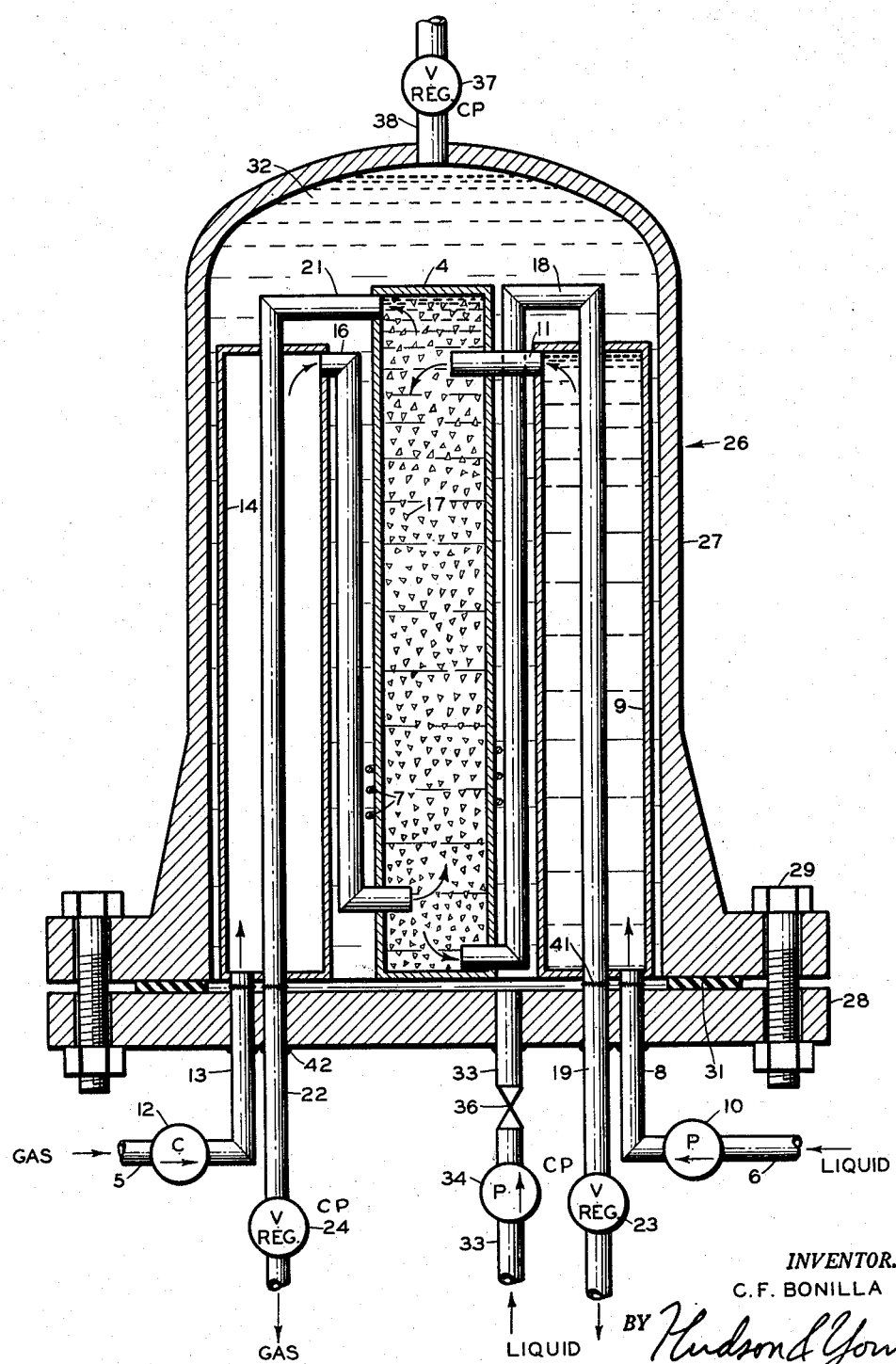
Figure 1 is a cross sectional elevational view of a reaction chamber embodying the present invention.

In Figure 1 a reaction is being carried out in reaction chamber 4. While not limited to any particular reaction, the reaction is between a fluid in the form of a gas, or a vapor, entering the system through pipe 5, such as an olefin, and a fluid in the form of a liquid entering the system through pipe 6, such as a dilute aqueous solution of sulfuric acid. Such reactant fluids upon reacting in chamber 4 create heat during the reaction, or they may be heated to aid the reaction by means of an electrical heating coil 7 to increase the speed of reaction to a commercial rate. At such elevated temperatures one or more of the reactant fluids may be very corrosive whereas at atmospheric temperature it would not be regarded from a commercial standpoint as corrosive, because commercially speaking any fluid which may be passed through a pipe made of a relatively cheap material such as iron, copper or aluminum is not regarded as corrosive. In some instances it may be desirable to use corrosive resistant pipes throughout, pipe 6 for example being made of steel lined with lead, but the corrosion resistant pipe used for portions of the system under atmospheric temperature, such as pipe 6, are much cheaper and more readily available than materials suitable for reaction chamber 4 where there is both elevated temperature and pressure.

Chamber 4 may be composed of an alloy containing at least 10% by weight of an element selected from the corrosion resistant group of elements consisting of carbon, silicon, chromium, nickel, cobalt and titanium. Obviously it is desirable to use relatively inexpensive materials available on the market for such purposes. The Pacific Foundry Co. produces "Corrosiron" an alloy containing iron; .8 to 1% carbon; 14.5% and .05% manganese which has a melting point of 2300° F. and a tensile strength of 1600 p. s. i. It is resistant to most hot concentrated acids and dilute caustic solutions. It is preferred to make chamber 4 out of this material. A similar preferred material is "Duriron" having substantially the same analysis and properties, made by the Duriron Co. A more expensive alloy "K-42-B" made by Westinghouse Electric Corp. is an alloy containing 40 to 50% nickel, 20 to 30% cobalt, 1 to 4% titanium, 5 to 15% iron and 15 to 30% chromium. Its tensile strength at 110° F. is 8500 pounds per sq. in. and it possesses excellent resistance to corrosion by salt water, hydrochloric and nitric acids. "Karbate" made by the National Carbon Co. in two grades is 50% carbon treated to be impermeable to gases and liquids. It is resistant to attack by almost anything, except by oxidizing chemicals, but its tensile strength is only from 1700 pounds per sq. in. to 2400 pounds per sq. in. which is very low compared to "K-42-B" but the latter compound is not resistant to as many substances as the former, and also is considerably more expensive than other members of this group of compounds. All of these materials, however, are much weaker in tensile strength than is desirable for the fabrication of high pressure vessels, namely, at least 50,000 pounds per sq. in., roughly. It will therefore be seen that when a corrosion-resistant material is selected for chamber 4 that it will be weak in tensile strength, and therefore while it will resist the corrosion of the hot fluids it cannot resist the elevated pressure necessary for the reaction, because such reactions as the reaction of olefins with dilute sulfuric acid mentioned above only proceed fast enough to be of commercial value at much greater than atmospheric pressures.

The fluid in 6 is pumped into the system by a pump 10 and enters chamber 4 through an inlet conduit composed of tubes 8, 9, and 11. Similarly the fluid in 5 is compressed by a compressor 12 and forced into chamber 4 through an inlet conduit composed of tubes 13, 14, and 16. If desired, chamber 4 may contain a bed of granular solids 17 which may be inert, or which can be surface-active, or catalytic to the reaction. An outlet conduit is provided for the reactant from chamber 4 composed of tubes 18 and 19 while a similar outlet conduit is provided for the gas composed of tubes 21 and 22. In order to maintain a predetermined pressure in chamber 4 outlet conduits 19 and 22 respectively may be provided with constant pressure regulating valves 23 and 24. The simplest form for valves 23 and 24 are simple pressure relief valves which open whenever the pressure upstream in the valve exceeds the predetermined amount, but obviously any other kind of regulating valve providing a constant pressure may be employed.

Reaction chamber 4 and tubes 9, 11, 14, 16, 18 and 21 all being made of a material low in tensile strength must be protected from rupture caused by internal pressure, and in the present invention this is done by surrounding the same with a housing, generally designated as 26, which for convenience of assembly and disassembly is generally made in at least two parts 27 and 28 secured together by any conventional fastening means such as bolts 29. A seal between the parts 27 and 28 may be more easily obtained when a washer 31 of a resilient nature is employed in the usual manner.

The space 32 between chamber 4 and housing 26 is filled with a fluid, in this instance a liquid, supplied from pipe 33 which is forced into the space by pump 34 and which may be retained therein by a cutoff valve 36 if desired. This liquid is maintained at a predetermined pressure substantially equal to the pressure inside reaction chamber 4. While it is desirable that the two pressures be exactly the same this is not essential, as considerable difference in pressure can occur before the elastic limit as to tensile strength of chamber 4 is exceeded, however in most instances there is no advantage to be gained by any difference in pressure and therefore it is preferable to have the pressure of liquid 32 as near the pressure of the fluids in chamber 4 as practical without unduly expensive regulation. The pressure of liquid 32 may be regulated by a constant pressure regulating valve 37 in an outlet tube 38, and valve 37 may be just a pressure relief valve if desired, but other forms of regulating valves may be used which retain a constant pressure on liquid 32.

Liquid 32 is an inert fluid. Up to 600 to 650° F. I prefer a low-volatility high-temperature petroleum oil such as "Meproline" secured from the Parks Cramer Co., and for somewhat high temperatures I prefer tetracresyl silicate, or diphenyl plus diphenyl oxide such as "Dowtherm A" made by the Dow Chemical Co. In some instances mercury, or other low melting metals, may be employed as liquid 32.

It will be noted that tubes 9 and 18 and tubes 14 and 21 respectively are in heat exchange relation with each other, so that by the time the fluid in the outlet conduits 18 and 21 reach the bottom of tubes 9 and 14 respectively they are below the temperature at which they are corrosive to ordinary materials having high tensile strength. Therefore tubes 13, 22, 19 and 8 may be made of ordinary materials of construction, it being desirable that they have about the same coefficient of thermal expansion as the material of chamber 4, and tubes 9, 18, 14 and 21, but as they are not in contact with the corrosive liquid at a high temperature, pipes 8, 19, 22 and 13 need not be resistant to corrosion at elevated temperature. Any chemical engineer can pick out suitable materials for pipes 8, 13, 19, and 22, but as an example when using "Duriron" or "Corrosiron" for reaction chamber 4 a suitable alloy for pipes 8, 13, 19 and 22 is type 441 stainless steel (chromium, 14 to 17%; nickel, 0 to 2.5%; carbon greater than .15% and the balance iron) or any other stainless steel alloy containing chromium, and for the "Karbate" reaction chamber 4 I prefer an alloy of approximately 33% nickel, .02 carbon and the balance iron. However it is to be understood that other alloys are suitable for this purpose. While tubes 8, 19, 22 and 13 may be screw threaded into tubes 9 and 14 or other securing means may be employed, I prefer to weld the tubes together by welds such as 41, and similarly these tubes may be secured by any usual means to plate 28 but again I prefer welds such as 42. If desired for reasons of economy, as soon as tubes 8, 13, 19 and 22 emerge from plate 28 they can be secured to still more inexpensive tubes (not shown) as by that time the requirement of the tubes is further reduced in that it is no longer necessary to approach the coefficient of thermal expansion of tubes 9 and 14, but while the temperature has been reduced to atmospheric the pressure is still high. On the opposite side of pump 10, compressor 12 and valves 23 and 24, still cheaper tube material probably may be employed, as the requirement of resisting high pressure is also removed, so that these portions of the tubes may be made out of additional materials, easily selected by a chemical engineer.

Figures 2, 3:
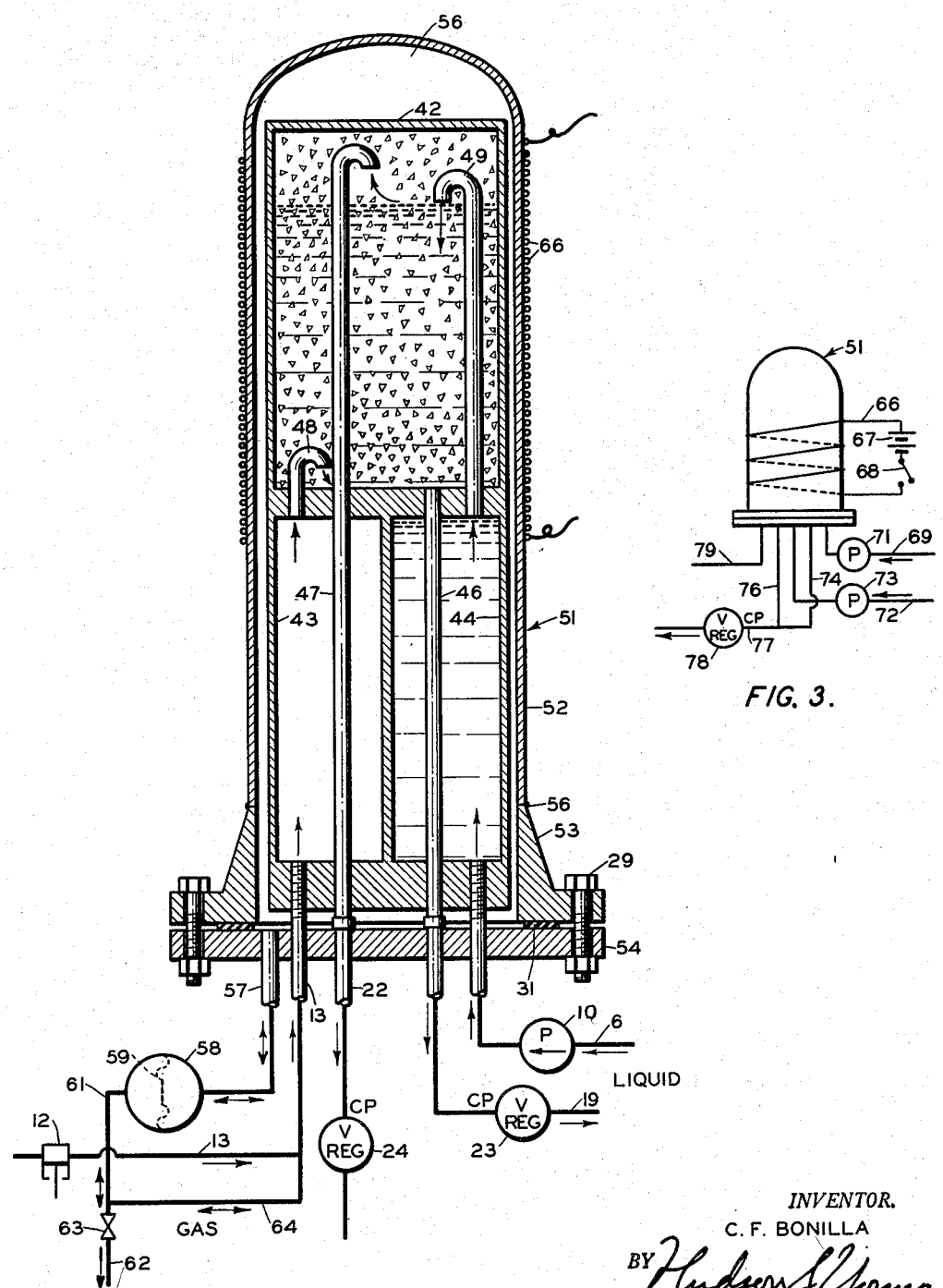
Figure 2 is a similar view of a modified form of apparatus embodying the present invention.
Figure 3 is an elevational view of a third modification of apparatus embodying the present invention.

It is not believed necessary to describe Figure 2 in the detail used in describing Figure 1, but merely to point out differences between the two figures. In Figure 2 the reaction chamber 42 and the heat exchange chambers 43 and 44 along with outlet tubes 46 and 47 and inlet tubes 48 and 49 are all made integral, or with a minimum number of parts, of a corrosion-resistant alloy like "Duriron" or other substances like "Karbate" or "Corrosiron" by casting the alloy or otherwise forming the solid into the shape desired.

Parts 42 to 49 inclusive are made of the same material as chamber 4. Similar to Figure 1 the device in Figure 2 is provided with a housing generally designated as 51 which is shown made in three parts 52, 53 and 54, parts 52 and 53 being secured together with welding as at 55, while parts 53 and 54 are secured together by bolts 29 and washer 31. Lines 6, 19, 13 and 22 are the same as in Figure 1 and are provided with pump 10, valves 23 and 24 and compressor 12 as shown.

Instead of using an inert liquid, an inert gas 56 is employed between housing 51 and chamber 42, nitrogen under pressure being preferred as the inert gas. It should be understood that a liquid such as used in Figure 1 can be substituted for inert gas 54 if desired. In order to maintain pressure on fluid 56, pipe 57 is provided having a hydraulic pressure equalizer or accumulator 58 therein, which may be of the usual form having a flexible diaphragm or septum 59 therein which separates the gas in line 61 from the fluid in line 57, but allows transmission of the pressure and allows for considerable change in the amount of fluid in chamber 56.

While compressor 12 is used for forcing gas in through line 13, lines 64 and 61 bring this same pressure to the reactant gas side of pressure equalizer 58, thus automatically maintaining fluid 56 at the proper balancing pressure, with no additional equipment. Valve 63 and line 62 are provided for removing any liquid that collects in line 64 or testing for puncture of diaphragm 59.

In order to heat the reaction chamber 42, if desired, an electrical heating coil 66 may be secured to the upper portion of the housing 51. A battery 67 and switch 68 is provided to show one possible means of electrical supply. Heating the top of 42 does not unduly heat the heat exchange chambers 43 and 44 as they are below the heating coil 66.

Figure 3 shows a chamber which may be constructed as shown in Figures 1 or 2, or which may embody features of both, in which the reactants are both liquids. One liquid comes in through pipe 69 and is pumped by pump 71 while the other reactant comes in pipe 72 and is pumped by pump 73. The two liquids mix and react, and come out as a single stream 74, or if it is desired to use the structure shown in Figures 1 and 2 exactly, a second outlet stream can come through outlet 76, and if desired be combined with stream 74 in pipe 77. The pressure in the reaction chamber is governed by regulating valve 78 in outlet conduit 77, and the pressure of fluid between the housing and the reaction chamber is controlled by a pressure fluid through pipe 79. It is also possible to have a reaction in which two immiscible liquids enter through pipes 69 and 72 and two immiscible liquids of different specific gravities emerge through pipes 74 and 76, in which case the liquids in pipes 74 and 76 may be kept separate by the means shown in Figures 1 and 2, the difference then being that a pump (not shown in Figures 1 or 2) is substituted for the compressor 12 therein.

*Operation*

The operation of Figure 1 is representative. A relatively cool liquid reactant is pumped through pipe 6 into heat exchanger 9 where it is heated and passes into chamber 4 to react with a gas 5. Similarly gas 5 has been compressed by compressor 12 and passed in heat exchanger 14 until it enters chamber 4 in a hot condition through tube 16. The liquid and gas pass countercurrent through bed 17 and generate heat or are heated by coil 7. Under such conditions one or more of the fluids become intensely corrosive, and therefore it is necessary that chamber 4 and heat exchangers 9 and 14 be made of corrosion resistant material. Such material is generally weak in tensile strength, and therefore housing 26 must be kept full of an inert fluid 32 at a pressure equivalent to that in chamber 4 to prevent rupture of chamber 4. Materials emerging from chamber 4 through outlet pipes 21 and 18 are cooled down in heat exchangers 9 and 14 to a point where they are no longer considered corrosive and can then be handled by materials of construction stronger in tensile strength but weaker in corrosion resistance such as pipes 19 and 22. It is evident that if desired, additional electric or other heating of the streams entering the reactor 4 could be provided at pipes 9, 11, 14 and/or 16, and additional coolers for the outgoing streams in pipes 18 and 21 could be provided below the heat exchangers 9 and 14, but within the housing 26 if required to produce in the most economical way the necessary cooling so that pipes 19 and 22 would not be unduly corroded.

It is also evident that one or all heaters for the inlet streams could be eliminated if the reaction were sufficiently exothermic.

The operation of Figures 2 and 3 is the same as Figure 1 except for minor details already discussed above.

While I have shown specific apparatus embodying my invention it should be understood that such apparatus is shown for purposes of illustration and is not a limitation of the invention which is only defined as to its scope in the following claims.

Having described my invention, I claim:

1. Apparatus for continuously reacting fluids at a greater temperature than atmospheric temperature and a greater pressure than atmospheric pressure comprising a reaction chamber made of material resistant to corrosion of said fluids at said temperature and pressure but incapable of resisting the stress of having said pressure as unbalanced internal pressure, at least one inlet conduit and one outlet conduit connected to said chamber, an indirect heat exchanger comprising a portion of each of said conduits in heat exchange relation with each other, said heat exchanger and said conduits between said heat exchanger and said chamber being made of the same material as said chamber, a housing surrounding said chamber and said heat exchanger, said housing being made of material resistant to internal pressure, said inlet conduit and said outlet conduit extending from said heat exchanger through said housing to the exterior thereof, said conduits adjacent and exterior of said housing being made of stress resistant material, means to continuously force fluids corrosive to the material of said housing at an elevated temperature under pressure into said inlet conduit exterior of said housing, means to continuously maintain a predetermined back pressure on fluid emerging through said outlet conduit, and means to continuously supply a fluid chemically inert to the materials of said chamber, said housing and said conduits, from atmospheric temperature to the temperature of said chamber, under pressure to said housing to balance the pressure in said chamber and thereby relieve said chamber from any stress due to internal pressure, the interior of said inlet and outlet conduits and said reaction chamber being disposed out of fluid communication with the space in said housing surrounding said chamber.

2. In the combination of claim 1 a heater positioned and disposed to heat said chamber.

3. Apparatus for continuously reacting fluids, at least one of which is corrosive at elevated temperatures, at greater temperatures and at higher pressures than atmospheric, comprising a reaction chamber made of material resistant to corrosion of said fluids at said temperatures and pressures, but weak in tension, a housing surrounding said chamber, a pressure fluid chemically inert to the materials of said chamber, said housing and said conduits from atmospheric temperature to the temperature in said chamber, in the space between the chamber and the housing, means to continuously maintain the pressure fluid at substantially the same pressure as that of the fluids inside said chamber, an inlet conduit and an outlet conduit passing into said housing and communicating with said chamber, means for continuously passing fluid corrosive to the material of said housing at an elevated temperature through said conduits and said chamber at a predetermined elevated pressure, and means for continuously cooling said outlet conduit between said chamber and said housing so that at least that portion of said outlet conduit exterior of said housing may be made of a material strong in tension, the major portion of said outlet conduit inside said housing, which major portion is connected to said chamber, being made of material resistant to corrosion of said fluids at elevated temperature and pressures, but weak in tension, the interior of said inlet and outlet conduits and said reaction chamber being disposed out of fluid communication with the space in said housing surrounding said chamber.

4. In the combination of claim 3 a heater positioned and disposed to heat said chamber.

5. Apparatus for continuously reacting fluids at a greater temperature than atmospheric and a greater pressure than atmospheric pressure comprising a reaction chamber, two inlet conduits and two outlet conduits connected to said chamber, two indirect heat exchangers each comprising a portion of one of said inlet conduit and one of said outlet conduits respectively in heat exchange relation with each other, a housing surrounding said chamber and said heat exchangers, said inlet conduits and said outlet conduits all extending from said respective heat exchangers through said housing to the exterior thereof, means to continuously force fluids under pressure into said inlet conduits exterior of said housing, means to continuously maintain a predetermined back pressure on fluids emerging through said outlet conduits, and means to continuously supply a fluid under pressure to said housing to balance the pressure in said chamber and thereby relieve said chamber from any stress due to internal unbalanced pressure, the interior of said inlet and outlet conduits and said reaction chamber being disposed out of fluid communication with the space in said housing surrounding said chamber.

6. Apparatus for continuously reacting fluids comprising a reaction chamber, first and second indirect heat exchangers secured to said reaction chamber and disposed at one end thereof, first and second inlet conduits connected to said chamber and comprising one indirect heat exchange portion of each of said indirect heat exchangers respectively, first and second outlet conduits connected to said chamber and comprising a second indirect heat exchange portion of each of said indirect heat exchangers respectively, a housing surrounding said chamber and said heat exchangers, said inlet conduits and said outlet conduits extending from said heat exchangers through said housing to the exterior thereof, an electrical resistance heating element positioned and disposed around said housing adjacent said chamber, said indirect heat exchangers extending into a portion of said housing not surrounded by said electric resistance heating elements, said inlet and said outlet conduits extending from said heat exchangers through said housing at points remote to said electric resistance heating element, to the exterior of said housing means to continuously force fluids under pressure into said inlet conduits exterior of said housing, means to continuously maintain a predetermined back pressure on fluids emerging from said outlet conduits, and means to continuously supply fluid under pressure to said housing to balance the pressure in said chamber and thereby relieve said chamber from any stress due to internal pressure, the interior of said inlet and outlet conduits and said reaction chamber being disposed out of fluid communication with the space in said housing surrounding said chamber.

CHARLES F. BONILLA.

References Cited in the file of this patent

UNITED STATES PATENTS

| Number | Name | Date |
|---|---|---|
| 1,286,135 | Somermeier | Nov. 26, 1918 |
| 1,426,920 | Sleeper | Aug. 22, 1922 |
| 1,893,492 | Brill | Jan. 10, 1933 |
| 1,986,196 | Grosee | Jan. 1, 1935 |
| 1,987,552 | Fauser | Jan. 8, 1935 |
| 2,034,693 | Datin | Mar. 24, 1936 |